United States Patent [19]

Stone

[11] 4,029,344

[45] June 14, 1977

[54] CONNECTION JOINT FOR PREFABRICATED METAL CHIMNEY

[75] Inventor: Richard L. Stone, Los Altos Hills, Calif.

[73] Assignee: Wallace-Murray Corporation, Belmont, Calif.

[22] Filed: Sept. 23, 1976

[21] Appl. No.: 725,951

[52] U.S. Cl. .................................. 285/47; 138/148; 285/133 R; 285/373

[51] Int. Cl.² .......................................... F16L 39/00

[58] Field of Search ............ 285/47, 133 R, 133 A, 285/424, 302, 367, 373, 419, DIG. 5, 187; 138/148, 149

[56] References Cited

UNITED STATES PATENTS

| 2,362,557 | 11/1944 | Jahns | 285/47 |
| 2,679,867 | 6/1954 | Epstein | 285/424 X |
| 2,894,537 | 7/1959 | Carr | 285/47 X |
| 3,226,135 | 12/1965 | Epstein | 285/133 R X |
| 3,889,715 | 6/1975 | Lilja et al. | 138/149 X |
| 3,902,744 | 9/1975 | Stone | 285/373 X |

FOREIGN PATENTS OR APPLICATIONS 679,434  2/1964  Canada .............................. 138/149

*Primary Examiner*—Thomas F. Callaghan
*Attorney, Agent, or Firm*—Owen, Wickersham & Erickson

[57] ABSTRACT

A prefabricated metal chimney formed of double wall sections which can be connected so that the inner pipe joints are substantially air or smoke tight. The inner pipes of adjacent sections have end flanges which engage and are held together by an inner band member. Attached near each opposite end of the outer wall member for each section is a spacer band with circumferentially spaced apart tab means. Inter tab means extend radially outwardly from the band and is fixed to the outer pipe wall while inner tab means is held to the inner pipe by the inner band member.

5 Claims, 11 Drawing Figures

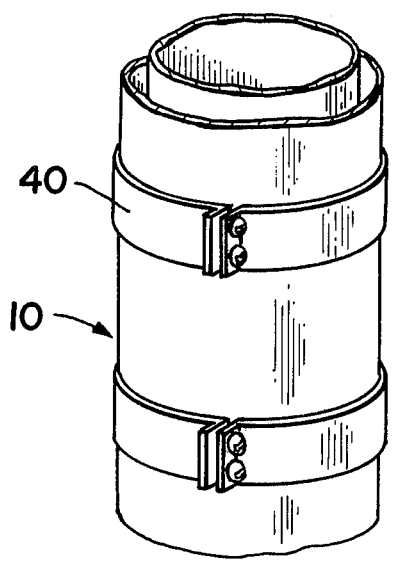
FIG _ 1
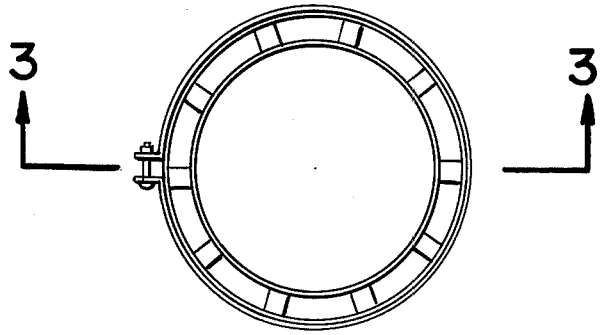
FIG _ 2
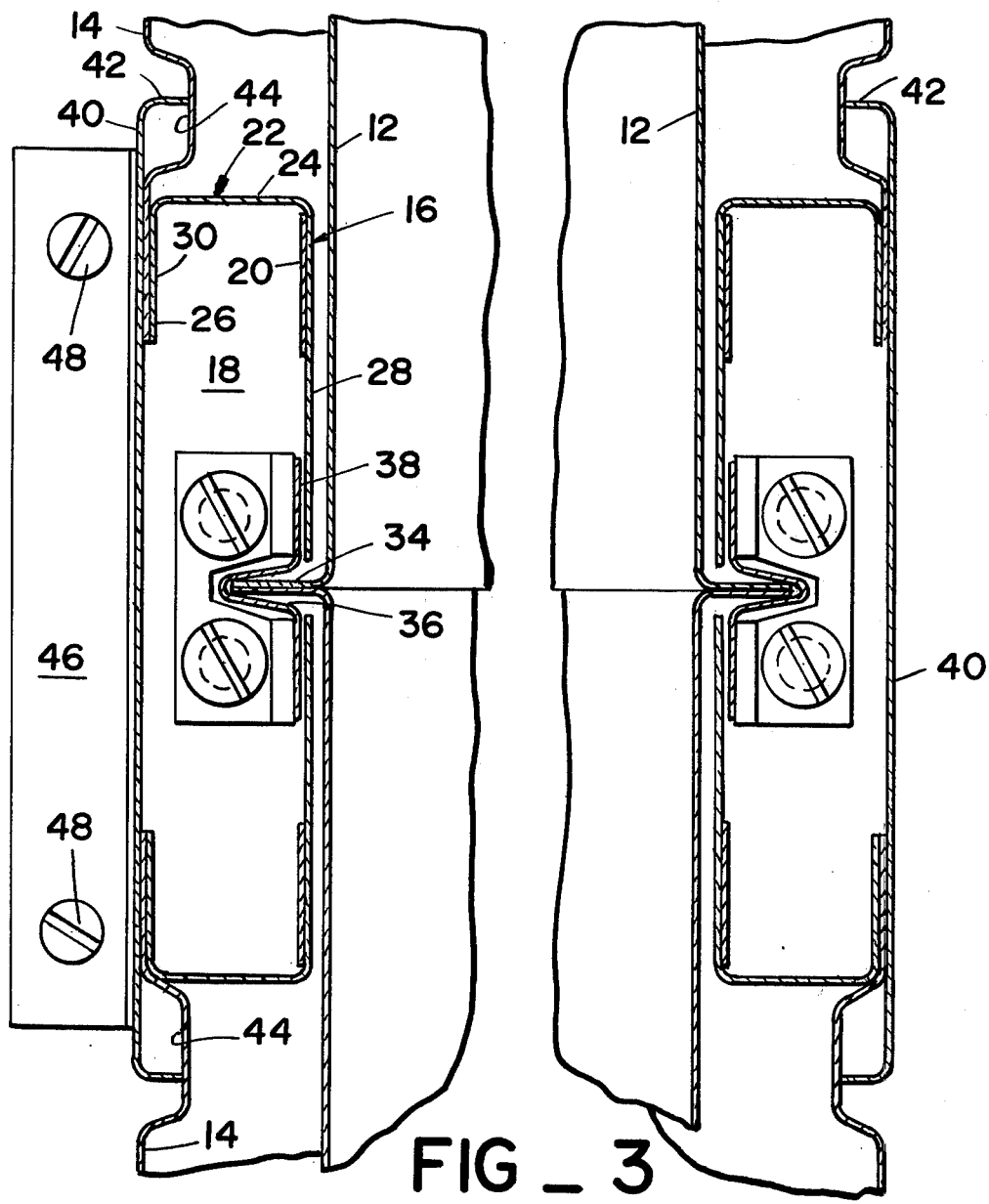
FIG _ 3

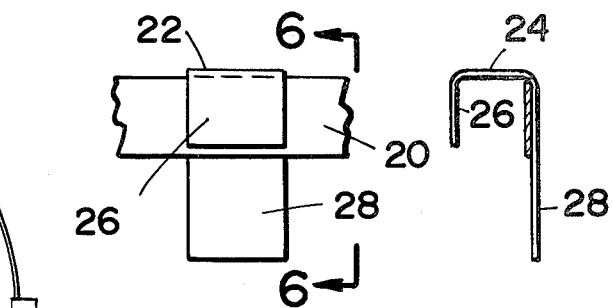
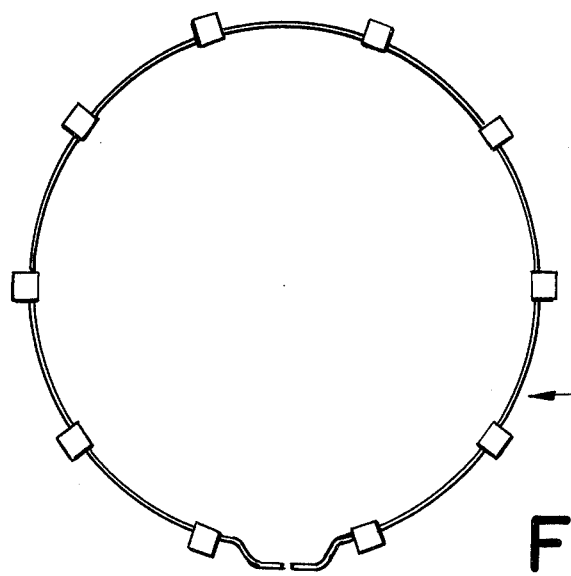
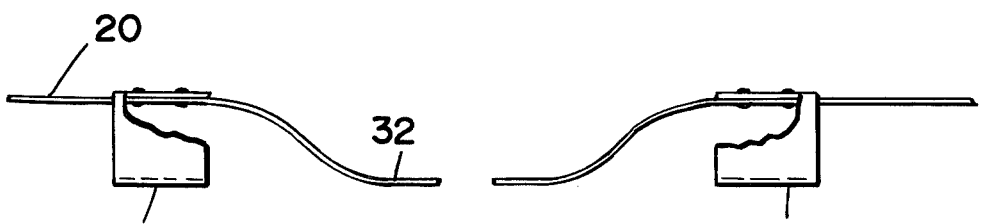
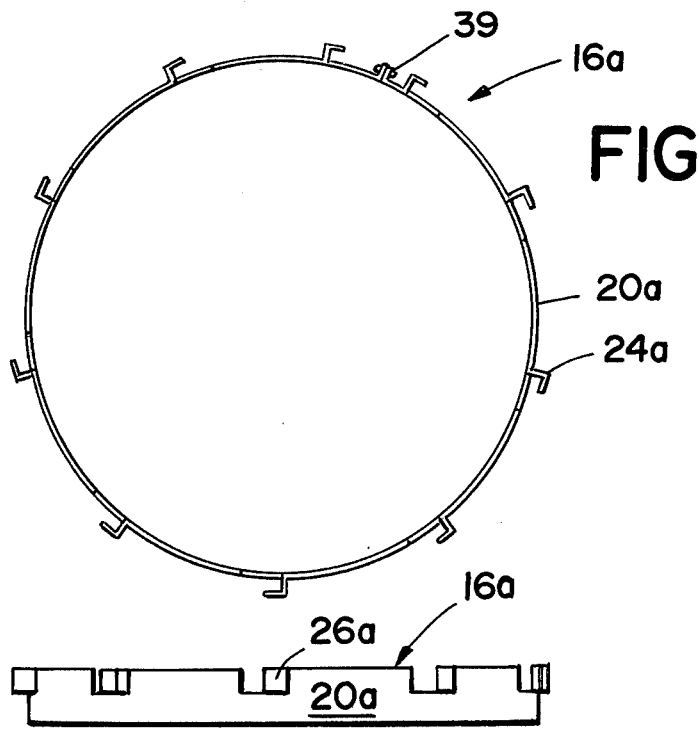
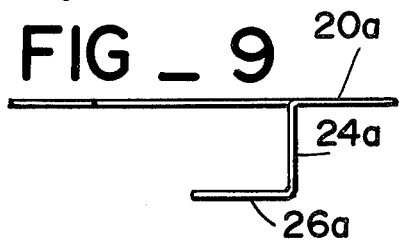
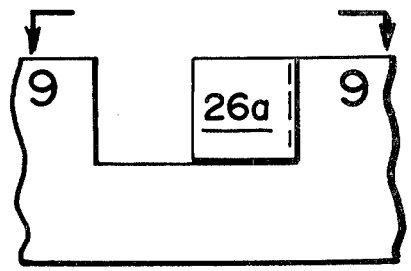

CONNECTION JOINT FOR PREFABRICATED METAL CHIMNEY

BACKGROUND OF THE INVENTION

In my previous U.S. Pat. No. 3,902,744 a prefabricated metal chimney comprised of a plurality of double-walled chimney sections is disclosed wherein the inner wall members are joined together in such a way that a substantially air or smoke tight inner flue passage is provided throughout the chimney. In order to space the outer wall member properly from the inner wall member a series of circumferentially spaced apart spacer connectors were used at each end of each chimney section. Although the aforesaid arrangement proved satisfactory for overcoming the leakage problem of the inner pipe, a problem arose in certain installations with the individual spacer connectors. For many situations where unsymmetrical exterior loading was applied to the chimney, it was found that only one or two of the ndividual spacer connectors would take the entire load. This tended to cause a displacement of the inner relative to the outer pipe or, in some cases, a failure of the individual connector.

It is therefore one object of the present invention to solve the aforesaid problem and provide an improved prefabricated double-walled chimney section.

Another object of the invention is to provide an improved prefabricated double-walled metal chimney section that can be combined with like sections to form a chimney having a leak proof inner flue and wherein asymmetrical exterior loading will be transmitted substantially uniformly from the outer wall member to the inner wall member. Yet another object of the present invention is to provide a prefabricated double-walled metal chimney section that is particularly strong and durable when subjected to exterior loads and is also relatively easy to assemble in large scale production.

BRIEF SUMMARY OF THE INVENTION

A prefabricated metal chimney section which accomplishes the foregoing objectives comprises a cylindrical inner wall member and a concentric outer wall member of a greater diameter that forms an insulating space between them. The ends of the inner wall member have radially outwardly extending flanges and for adjoining chimney sections these flanges are held together by an inner V-shaped band. Near the end of each chimney section is a circular band to which are attached circumferentially spaced apart spacer connector members having two leg portions. An outer leg portion on each connector member extends radially outwardly from the band and then parallel to it and is fixed to the outer wall member. An inner leg portion on each connector member extends axially from the band and is retained against the inner wall member by the V-shaped band. Thus, at each end of the double-walled chimney section the inner and outer wall members are held together structurally by a series of circumferentially spaced apart spacer connector members which themselves are fixed to a circular band. This prevents any one of the spacer connectors from absorbing the entire stress from an exterior side load and instead any such load, when applied, is distributed from outer to inner wall member through all of spacer connectors. The result is a stronger, more durable chimney structure.

Other objects, advantages and features of the invention will become apparent from the following detailed description taken with the accompanying drawing.

BRIEF DESCRIPTION OF THE DRAWING

FIG. 1 is a fragmentary view in perspective showing a portion of a prefabricated metal chimney embodying the principles of the present invention;

FIG. 2 is a cross-sectional view of the chimney of FIG. 1;

FIG. 3 is an enlarged fragmentary view in elevation and in section taken at line 3—3 of FIG. 2;

FIG. 4 is a plan view of a spacer connector for a double-walled prefabricated metal chimney according to the present invention;

FIG. 4A is an enlarged view showing the end portions of the spacer connector of FIG. 4;

FIG. 5 is an enlarged fragmentary view in elevation of the spacer band of FIG. 4;

FIG. 6 is a view in section taken along line 6—6 of FIG. 5;

FIG. 7 is a plan view of another form of spacer connector according to the invention;

FIG. 7A is view in elevation of the spacer connector of FIG. 7;

FIG. 8 is an enlarged fragmentary view in elevation of the band shown in FIG. 7; and FIG. 9 is a view taken along line 9—9 of FIG. 8.

DETAILED DESCRIPTION OF EMBODIMENTS

With reference to the drawing, FIG. 1 shows a portion of a prefabricated metal conduit or chimney formed of axially connection section 10 embodying the principles of the present invention. Each section, as seen in FIGS. 2 and 3, is comprised of an inner wall member 12 constructed so as to form an air or gas tight joint with the inner wall member of an adjacent section. The inner wall member is preferably formed from a relatively thin sheet metal such as sheet steel which can vary in thickness depending on the size of the conduit (e.g. from 0.025 inches for a conduit diameter of 10 to 24 inches to 0.045 inches or heavier for a conduit diameter of 38 –48 inches or larger). This sheet metal inner wall is generally formed in a cylindrical shape that is joined along a longitudinal lock seam or weldment. An outer wall member 14 having a larger diameter and formed in a similar manner to the inner wall member is concentric with and spaced outwardly from the inner wall member. Near each of the opposite ends of each double-walled section 10 in the inner wall member 12 is connected to the outer wall member 14 by a spacer-connector 16 in accordance with the present invention. This band maintains an insulative space 18 between the inner and outer wall member and in the embodiment of FIGS. 3–6 it comprises a circular band 20 of sheet metal that is only slightly larger in diameter than the outer diameter of the inner wall member. Spaced apart circumferentially on this band are a series of sheet metal clips 22, each being bent to a generally inverted U-shape. Each clip has a top web portion 24, an outer downwardly extending tab portion 26 and a somewhat longer inner tab portion 28 that also extends downwardly and parallel to the outer tab portion. The outer tab portions 26 of each spacer-connector 16 are permanently attached, as by spot welds 30, to the inside surface of the outer wall member 14 near its end. The ends of the end circular band 20, as shown in FIG. 4, are also bent outwardly so that its end portion 32 may also be attached to the outer wall member.

At the opposite ends of the inner wall member 12 of each section 10 is a radially extending flange 34. When two sections are connected together, as shown in FIG. 3, these flanges 34 of adjacent and aligned sections 10 are brought into flush engagement and are retained together by an inner retaining band 36. This latter band has a V-shaped cross-section and fits over the edges of the engaged flanges. Projecting from the central V-shaped portion of the band 36 are integral cylindrical edge portions 38 that extend circumferentially around the adjacent inner wall sections. These edge portions also pass around and are adjacent to the inner tab portions 28 of all of the spacer clips 22 fixed to the space-connector band 20.

The inner tab portions 28 of the spacer clips 22, as shown in FIG. 3, preferably do not extend inwardly far enough to engage the outer surface of the inner wall member 12 but actually are spaced outwardly away from the inner wall member by a smaller amount (e.g. 0.004 to 0.008 inches) so as to avoid direct contact with it. The end edge of each inner tab portion 28 is closely adjacent to but also spaced somewhat from the inside surface of the inner wall end flange 34. Thus, even when the inner V band is tightened so that its edge portions bear against the spacer-connector tabs 28, the latter do not engage the outer surface of the inner wall member, thereby preventing any significant conductive heat transfer from the inner wall to the outer wall of each chimney section.

A modified form of spacer connector 16a, shown in FIGS. 7-9, may also be used in accordance with the principles of the present invention. In this embodiment, a circular band 20a is provided which has a diameter slightly larger (e.g. 0.08 to 0.16 inches) than the outside diameter of the inner wall member. At circumferentially spaced apart intervals on this band are cutout members having a radially extending web portion 24a and an outer tab portion 26a that is essentially parallel to the band 20a. The tab portions 26a are spot welded to the outer wall member in the same manner as the tab portions 26 of the previous embodiment. The width of the band 20a in the longitudinal direction of the chimney section is equivalent to that of the inner tab portions 28, and thus spacer-connector 16a is positioned relative to the end flange 34 of each chimney section 10 in the same manner as described above relative to the first embodiment. The ends of the band 20a are preferably held together by a metal screw 39 through adjacent flanges at the mating ends of the band.

As described in my previous U.S. Pat. No. 3,902,744 adjoining chimney sections 10 are also connected together by an outer band 40 that is formed with a circular shape and has upper and lower edge flanges 42 that extend radially inwardly. Each of these edge flanges is adapted to fit within an annular recess 44 formed near each end of the outer wall member 14 for each section 10. A right angle clip with an outwardly extending flange 46 is fixed each end of the band 40. These flanges are provided with openings through which machine screws 48 may be installed to hold the ends of the band together and draw it tightly around the outer wall member of adjoining chimney sections.

Each chimney section 10 is formed with its two major components, namely the inner wall member 12 and the inner retaining bands 36 and the outer wall member 14 with the attached spacer-connectors 16. When a prefabricated metal chimney is installed, the inner wall members are placed together first in alignment and with their end flanges 34 engaged. The outer wall members are positioned so that the inner tabs 28 of the spacer-connectors 16 are properly located with respect to the end flanges. The inner V-band is first tightened to hold the inner wall members together and to retain the inner tabs 28. Thereafter the outer band 40 can be installed as described to close the gap between outer wall members of adjoining chimney sections. The installation of a chimney can thus be accomplished rapidly with a minimum of labor and without the need for any special tools.

When in use, the band portion 20 of each spacer-connector 16 serves to distribute any exterior load on the chimney to all of its clip members 22. Therefore if a load is applied at one location, it will not be taken by only one clip, but will be distributed to all clips of the space-connector. This assures a stronger and more durable chimney structure.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A prefabricated double-walled chimney section adapted to be connected to a similar section to form a chimney column, said section comprising:

a cylindrical inner imperforate wall member having a radially extending flange at each end;

a cylindrical outer wall member having a greater diameter than and spaced outwardly from said inner wall member, said outer wall member being shorter than said inner wall member so that at least one end edge is spaced above the end flange of said inner wall member;

spacer connector means located between said inner and outer wall members near both ends, each said spacer connector means comprising a circular band portion, a plurality of web portions extending outwardly from circumferentially spaced apart locations on said band portion, outer tab means on each said web portion fixed to said outer wall member and inner tab means extending substantially parallel but unattached to said inner wall member and adjacent to its said radially extending flange;

an inner band means having a flange portion extending around said inner tab means of said spacer connector means and means on the opposite ends of said flange portion for drawing said inner band means tightly around said inner pipe member; and means near said end edge of said outer wall member for retaining a connectable outer band means adapted to extend circumferentially around said outer wall member.

2. The double-walled chimney section of claim 1 wherein said spacer connector means comprises a circular band and a series of clips having a generally inverted U-shape with an elongated leg forming said inner tab means and fixed to said band at circumferentially spaced apart locations.

3. The double-walled chimney section of claim 1 wherein said outer tab means are spot welded to said outer wall member and said inner tab means are spot welded to said circular band.

4. The double-walled chimney section of claim 1 wherein said circular band has end portions that are bent outwardly and are fixed to said outer wall member.

5. The double-walled chimney section of claim 1 wherein said spacer connector means comprises a circular band with integral, outwardly extending web portions having integral outer tab means fixed to outer wall member.

* * * * *